(12) United States Patent
Stoia et al.

(10) Patent No.: US 9,207,363 B2
(45) Date of Patent: Dec. 8, 2015

(54) ANTI-REFLECTION NANOSTRUCTURE ARRAY AND METHOD

(71) Applicant: The Boeing Company, Chicago, IL (US)

(72) Inventors: Michael F. Stoia, Rancho Santa Margarita, CA (US); Authi A. Narayanan, Thousand Oaks, CA (US); Stephen K. Wilcken, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 62 days.

(21) Appl. No.: 13/873,320

(22) Filed: Apr. 30, 2013

(65) Prior Publication Data

US 2014/0320967 A1 Oct. 30, 2014

(51) Int. Cl.
*G02B 27/00* (2006.01)
*G02B 1/118* (2015.01)

(52) U.S. Cl.
CPC ..................................... *G02B 1/118* (2013.01)

(58) Field of Classification Search
CPC ........... G02B 1/118; G02B 1/11; G02B 5/021
USPC .................................................. 359/589, 601
See application file for complete search history.

(56) References Cited

U.S. PATENT DOCUMENTS

2010/0149510 A1 6/2010 Zaczek et al.
2011/0102900 A1* 5/2011 Hayashibe et al. ........... 359/601

FOREIGN PATENT DOCUMENTS

EP 1 837 685 A1 9/2007
EP 2 426 520 A1 3/2012
EP 2426520 A1 * 3/2012 ............... G02B 1/11

OTHER PUBLICATIONS

International Search Report and Written Opinion, PCT/US2014/019514 (2014).
Sun et al., "Broadband moth-eye antireflection coatings on silicon," *Applied Physics Letters*, 92, 061112 (2008).
Song et al., "Antireflective nanostructures for high-efficiency optical devices," *SPIE* 10.1117/2.1201010.003261 (2010).
Li et al., "Bioinspired Silica Surfaces with Near-Infrared Improved Transmittance and Superhydrophobicity by Colloidal Lithography," *Langmuir* 26(12), 9842-9847 (2010).
Park et al., "Nanotextured Silica Surfaces with Robust Superhydrophobicity and Omnidirectional Broadband Supertransmissivity," *ACS Nano* (2012).

* cited by examiner

*Primary Examiner* — Joseph P Martinez
(74) *Attorney, Agent, or Firm* — Walters & Wasylyna LLC

(57) ABSTRACT

An anti-reflection nanostructure assembly including an array of nanostructures, wherein each nanostructure of the array includes a proximal end and a distal end, and is tapered from the proximal end to the distal end, and wherein the proximal end of each nanostructure of the array is contiguous with the proximal ends of adjacent nanostructures of the array to form a contiguous layer.

19 Claims, 9 Drawing Sheets

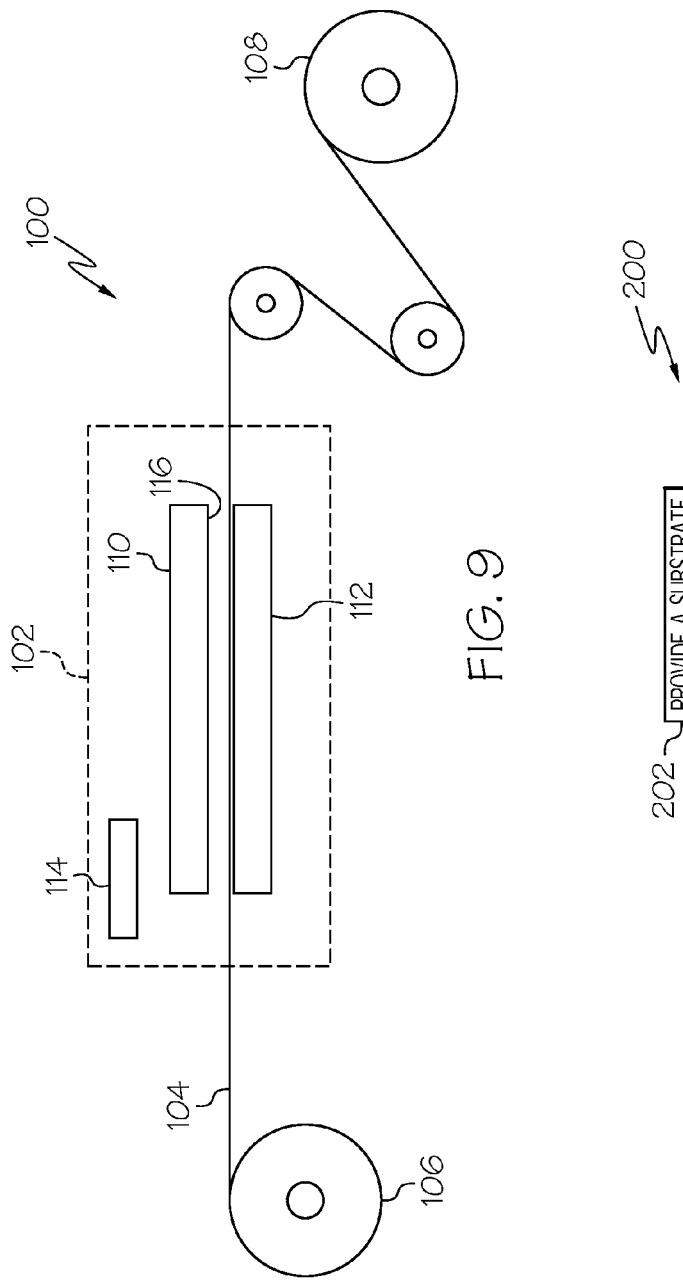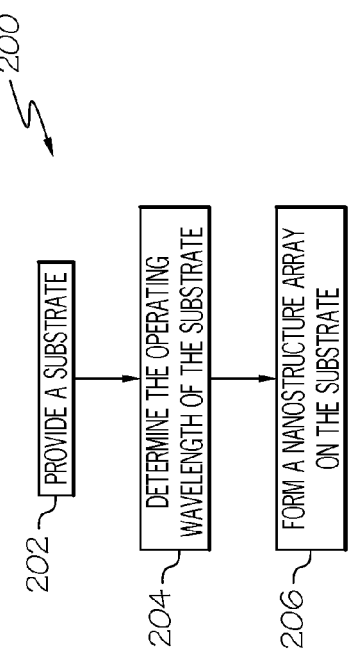

ANTI-REFLECTION NANOSTRUCTURE ARRAY AND METHOD

GOVERNMENT CONTRACT

The disclosed invention was made with government support under Other Transaction Authority (OTA) agreement number HR0011-10-9-0010 awarded by the Defense Advanced Research Projects Agency. The government of the United States of America may have certain rights in the disclosed invention.

FIELD

This application relates to anti-reflection and, more particularly, to anti-reflection nanostructure arrays.

BACKGROUND

Optical reflections are undesirable in many fields, such as photovoltaics (e.g., solar cells), lighting (e.g., light emitting diodes), displays (e.g., computer displays and televisions), windows (e.g., windshields), sensors, detectors, gun sights, binoculars, spectacles and sunglasses. For example, a substantial portion (e.g., 30 percent or more) of the sunlight applied to a typical silicon solar cell may be reflected at the surface of the solar cell, thereby significantly reducing the amount of light absorbed by the solar cell and, hence, the amount of electrical energy that may be generated by the solar cell.

Optical reflections occur at the interface between two materials having substantially different indices of refraction. For example, in a silicon solar cell, the optical reflection occurs at the air-to-solar cell interface because air has an index of refraction that is substantially less than the index of refraction of silicon.

Various anti-reflection coatings have been developed in an attempt to reduce optical reflections. More recently, anti-reflection nanostructures have been developed to reduce optical reflections. Both traditional index-matched coatings and modern anti-reflection nanostructures reduce optical reflections because the apparent index of refraction of the anti-reflection layer is less than, and transitions to, the index of refraction of the underlying substrate. Nonetheless, additional improvement in optical reflection reduction is desired.

Accordingly, those skilled in the art continue with research and development efforts in the field of anti-reflection.

SUMMARY

In one aspect, the disclosed anti-reflection nanostructure assembly may include a substrate and an array of nanostructures on the substrate, wherein the array of nanostructures is substantially free of interstitial gaps such that the apparent index of refraction of the array, in a direction perpendicular to said surface, varies smoothly.

In another aspect, the disclosed anti-reflection nanostructure assembly may include a substrate and an array of nanostructures, wherein each nanostructure of the array includes a proximal end and a distal end, and is tapered from the proximal end to the distal end, and wherein the proximal end of each nanostructure of the array is contiguous with the proximal ends of adjacent nanostructures of the array to form a contiguous layer on the substrate.

In another aspect, the disclosed method for reducing reflectance at an interface may include the steps of (1) providing a substrate and (2) forming an array of nanostructures on the substrate, wherein each nanostructure includes a proximal end and a distal end, and is tapered from the proximal end to the distal end, and wherein the proximal end of each nanostructure is contiguous with the proximal ends of adjacent nanostructures to form a contiguous layer on the substrate.

Other aspects of the disclosed anti-reflection nanostructure array and method will become apparent from the following detailed description, the accompanying drawings and the appended claims.

BRIEF DESCRIPTION OF THE DRAWINGS

FIG. 9 is a schematic side elevational view of one aspect of the disclosed method for manufacturing an anti-reflection nanostructure assembly; and FIG. 10 is a flow chart depicting one aspect of the disclosed method for reducing reflectance at an air-to-substrate interface.

DETAILED DESCRIPTION

Figure 1A:
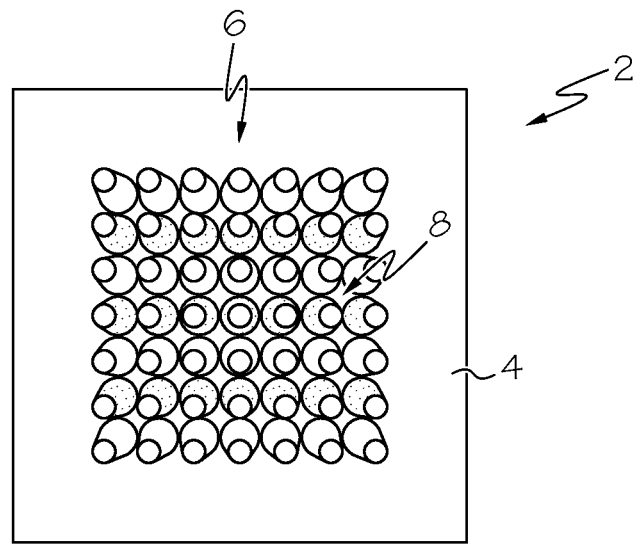
FIG. 1A is a top plan view of a prior art anti-reflection nanostructure assembly, which includes a nanostructure array on a substrate.
Figure 1B:
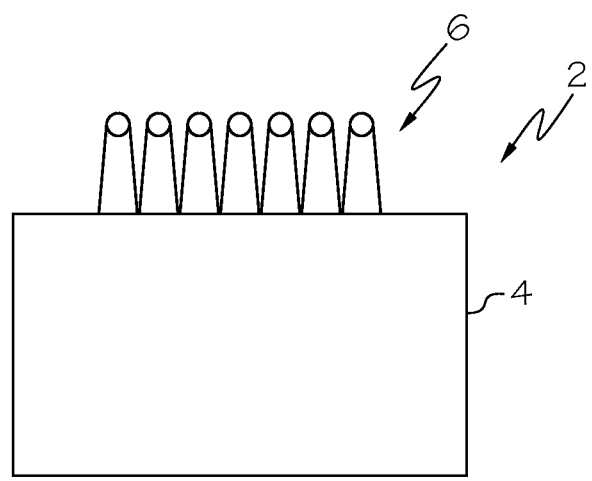
FIG. 1B is a side cross-sectional view of the anti-reflection nanostructure assembly of FIG. 1A.

As shown in FIGS. 1A and 1B, a conventional anti-reflection nanostructure assembly, generally designated 2, includes a substrate 4 (e.g., ethylene tetrafluoroethylene ("ETFE")) and a nanostructure array 6 on the substrate 4. The nanostructure array 6 defines interstitial gaps 8 between adjacent nanostructures of the nanostructure array 6, thereby exposing portions of the underlying substrate 4.

Figure 2A:
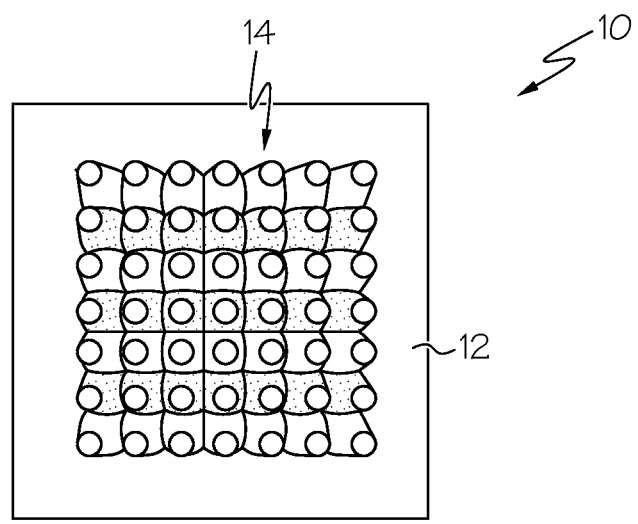
FIG. 2A is a top plan view of an aspect of the disclosed anti-reflection nanostructure assembly, which includes a nanostructure array on a substrate.
Figure 2B:
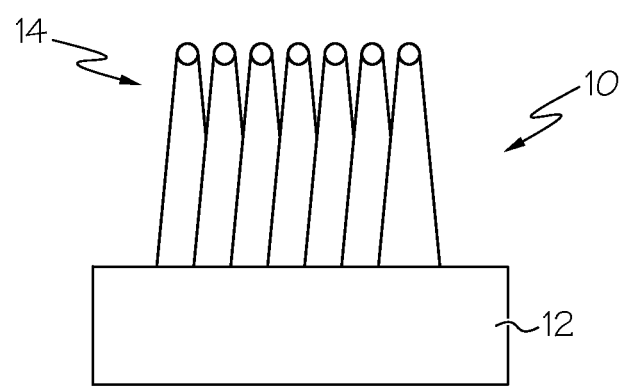
FIG. 2B is a side cross-sectional view of the anti-reflection nanostructure assembly of FIG. 2A.

As shown in FIGS. 2A and 2B, the disclosed anti-reflection nanostructure assembly, generally designated 10, may include a substrate 12 (e.g., ETFE) and a nanostructure array 14 on the substrate 12. The nanostructure array 14 may be configured to, among other things, substantially (if not completely) eliminate interstitial gaps and, thus, substantially (if not completely) eliminate exposed substrate 12.

Figure 3:
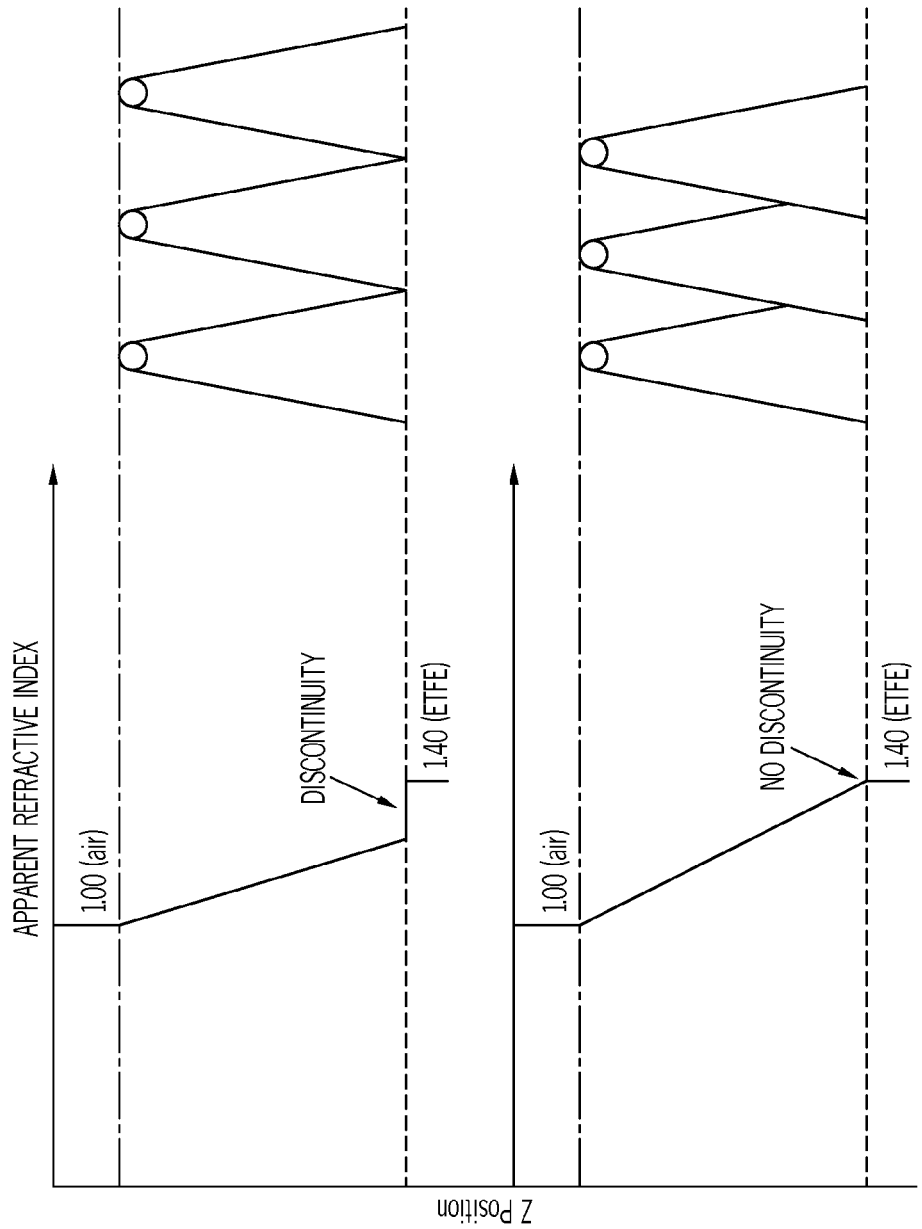
FIG. 3 is a graphical representation of the apparent index of refraction of the anti-reflection nanostructure array of FIGS. 1A and 1B compared to the apparent index of refraction of the anti-reflection nanostructure array of FIGS. 2A and 2B.

Referring to FIG. 3, interstitial gaps between the nanostructures of a conventional anti-reflection nanostructure array (see FIGS. 1A and 1B) expose underlying substrate, which causes a local discontinuity in the apparent index of refraction when electromagnetic radiation propagates into the nanostructure array. The discontinuity may lead to reduced anti-reflection performance of the nanostructure array. Reducing or eliminating interstitial gaps (see FIGS. 2A and 2B) may reduce or eliminate exposed substrate, which may correspondingly reduce or eliminate local discontinuities, thereby significantly improving anti-reflection performance.

Figure 4:
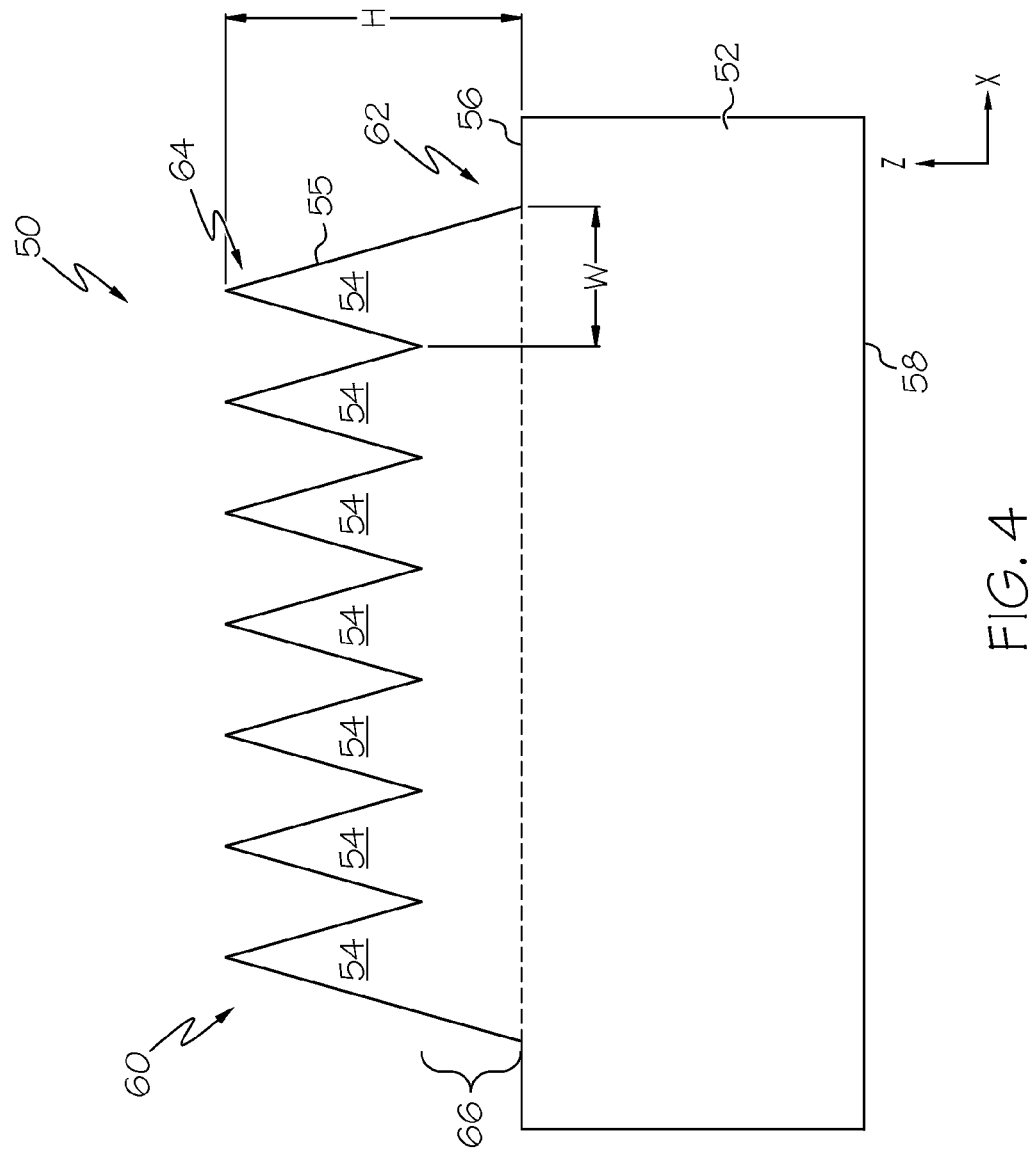
FIG. 4 is a side cross-sectional view of one particular aspect of the disclosed anti-reflection nanostructure assembly.

Referring to FIG. 4, one aspect of the disclosed anti-reflection nanostructure assembly, generally designated 50, may include a substrate 52 and a plurality of nanostructures 54. The substrate 52 may include a first major surface 56 and a second major surface 58. The nanostructures 54 may be arranged as an array 60 on the first major surface 56 of the substrate 52.

The substrate 52 may be formed from various materials. Those skilled in the art will appreciate that substrate material selection may depend on application. For example, the substrate 52 may be formed from optical materials, such as optical materials that are transparent (or at least partially transparent) to visible light, infrared light and/or ultraviolet light.

In one implementation, the substrate 52 may be formed from a polymer material. Examples of polymer materials suitable for use as the substrate 52 include, but are not limited to, ethylene tetrafluoroethylene ("ETFE"), fluorinated ethylene propylene ("FEP"), and polycarbonate. In another implementation, the substrate 52 may be formed from glass, such as a silicate glass. In yet another implementation, the substrate 52 may be formed from a semiconductor material. Examples of semiconductor materials suitable for use as the substrate 52 include, but are not limited to, silicon and gallium arsenide.

The substrate 52 may be configured in various ways. For example, the substrate 52 may be configured as a film, a wafer, a panel, a lens or the like. Those skilled in the art will appreciate that substrate configuration may depend on application and the type of substrate materials being used, among other factors.

The nanostructures 54 may also be formed from various materials. Those skilled in the art will appreciate that nanostructure material selection may be dictated by, among other things, the type of substrate material being used, the method used to form the nanostructures 54, and the end application.

In one realization, the nanostructures 54 may be formed from the same material as the substrate 52. As one specific, non-limiting example, both the nanostructures 54 and the substrate 52 may be formed from an optical polymer, such as ETFE. Optionally, the nanostructures 54 may be integral with the substrate 52 (the nanostructures 54 and substrate 52 may be formed as a single monolithic body).

In another realization, the nanostructures 54 may be formed from a different material than the substrate 52. For example, the substrate 52 may be formed from an inorganic material that is not readily imprintable/embossable, such as glass or a semiconductor material, and the nanostructures 54 may be formed from a resist material (e.g., a curable polymer) that has been applied to the substrate 52. Combinations of various materials may be used without departing from the scope of the present disclosure.

Still referring to FIG. 4, each nanostructure 54 may include a proximal end 62 and a distal end 64. The proximal end 62 of each nanostructure 54 may be connected to the first major surface 56 of the substrate 52 such that the distal end 64 protrudes away from the substrate 52. The z-directional spacing between the first major surface 56 of the substrate 52 and the distal end 64 of the nanostructure 54 may define the height H of the nanostructure 54. The proximal end 62 of each nanostructure 54 may define the maximum width W of the nanostructure 54.

The height H of each nanostructure 54 may be a design consideration and may be dictated by, among other things, the operating wavelength (or wavelength range) of the anti-reflection nanostructure assembly 50. As one example, when the anti-reflection nanostructure assembly 50 is designed for 500 nm light, the height H of each nanostructure 54 may range from about 400 nm to about 600 nm. As another example, when the anti-reflection nanostructure assembly 50 is designed for visible light (about 390 nm to about 700 nm), the height H of each nanostructure 54 may range from about 350 nm to about 800 nm. As yet another example, the height H of each nanostructure 54 may range from about 100 nm to about 1500 nm.

Likewise, the maximum width W of each nanostructure 54 may be a design consideration and may be dictated by, among other things, the operating wavelength (or wavelength range) of the anti-reflection nanostructure assembly 50. As one example, when the anti-reflection nanostructure assembly 50 is designed for 500 nm light, the maximum width W of each nanostructure 54 may range from about 400 nm to about 600 nm. As another example, when the anti-reflection nanostructure assembly 50 is designed for visible light (380 nm to 750 nm), the maximum width W of each nanostructure 54 may range from about 350 nm to about 800 nm.

Thus, each nanostructure 54 may have an aspect ratio—the ratio of the height H to the width W—that falls within a particular range. In one expression, the aspect ratio of each nanostructure 54 may range from about 0.5 to about 4. In another expression, the aspect ratio of each nanostructure 54 may range from about 1 to about 3. In yet another expression, the aspect ratio of each nanostructure 54 may range from about 1.5 to about 2.

Each nanostructure 54 may be tapered from proximate the proximal end 62 to proximate the distal end 64. The taper (slope) may be gradual and substantially constant, though nanostructures 54 having a varying taper are also contemplated. In one construction, each nanostructure 54 may have a regular conical structure with a substantially circular cross-section in the horizontal (x-axis) plane. In another construction, each nanostructure 54 may have an irregular conical structure (e.g., an ellipsoidal cross-section).

Without being limited to any particular theory, it is believed that a smoother transition of the index of refraction may be achieved by minimizing the thickness of the distal ends 64 of the nanostructures 54. Therefore, as shown in FIG. 4, the distal ends 64 of the nanostructures 54 may terminate at a pointed tip. However, nanostructures 54 having rounded or truncated distal ends 64 are also contemplated, and use of such blunt/truncated structures will not result in a departure from the scope of the present disclosure.

In one particular expression, the outer surface 55 of each nanostructure 54 may have a continuous curvature. For example, when viewed in cross-section taken in the horizontal (x-axis) plane, each nanostructure 54 may be curved (e.g., circular, ellipsoidal, etc.). In another expression, the outer surface 55 of each nanostructure 54 may be substantially free of facets. As used herein, a nanostructure 54 may be considered "substantially free of facets" if (1) the nanostructure 54 does not include any flat surfaces or (2) if it includes flat surfaces, but none of the flat surfaces have a characteristic length greater than ⅓ of the intended minimum operating wavelength of the anti-reflection nanostructure assembly. For example, the nanostructures 54 of an anti-reflection nanostructure assembly configured to operate in the visible spectrum—380 nm to 750 nm—will be considered "substantially free of facets" if the nanostructures 54 do not include any flat surfaces having a characteristic length greater than 127 nm (one third of 380 nm).

Without being limited to any particular theory, it is believed that facets will result in directional sensitivity to nanostructure performance. Therefore, it is believed that directional sensitivity may be reduced or eliminated by constructing the nanostructures 54 such that the outer surface 55 of each nanostructure 54 is substantially free of facets.

The number density of the array 60 (the number of nanostructures 54 per unit area of the first major surface 56 of the substrate 52) may be a design consideration and may be dictated by, among other things, the height H of the nanostructures 54, the maximum width W of the nanostructures 54, the aspect ratio of the nanostructures 54 and the geometry of the nanostructures 54. As one non-limiting example, the array 60 may have a number density ranging from about 1 to about 1000 nanostructures per square micrometer of substrate 52. As another non-limiting example, the array 60 may have a number density ranging from about 1 to about 500 nanostructures per square micrometer of substrate 52. As yet another non-limiting example, the array 60 may have a number density ranging from about 50 to about 100 nanostructures per square micrometer of substrate 52.

Figure 5A:
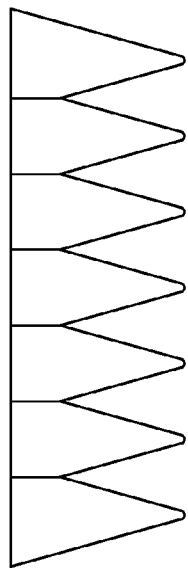
FIGS. 5A, 5B and 5C are side elevational, top plan and perspective views, respectively, of an aspect of the disclosed nanostructure array having a square packing configuration.
Figure 5B:
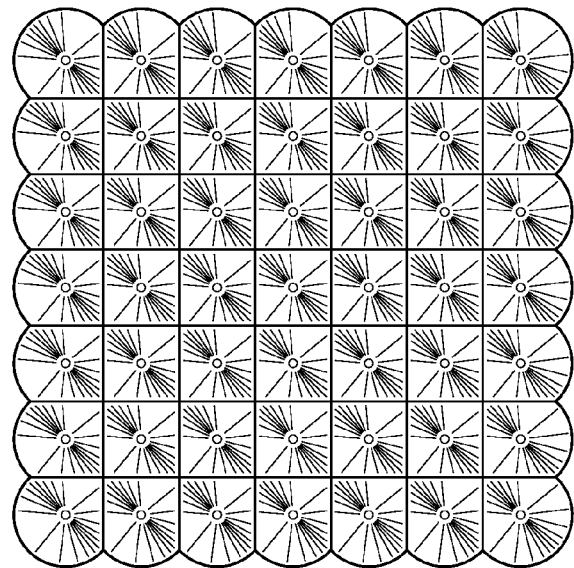
Figure 5C:
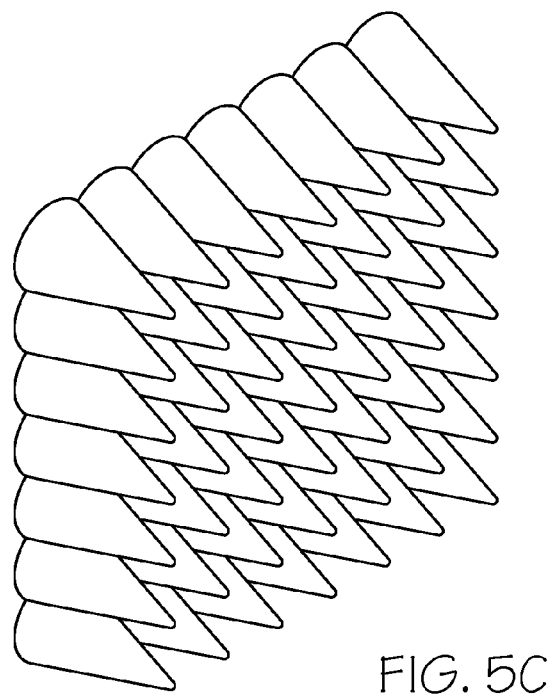
Figure 6A:
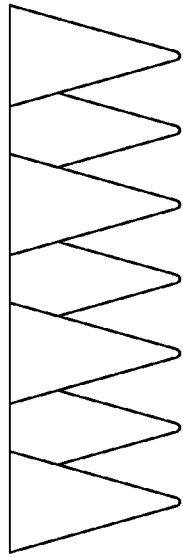
FIGS. 6A, 6B and 6C are side elevational, top plan and perspective views, respectively, of an aspect of the disclosed nanostructure array having a hexagonal packing configuration.
Figure 6B:
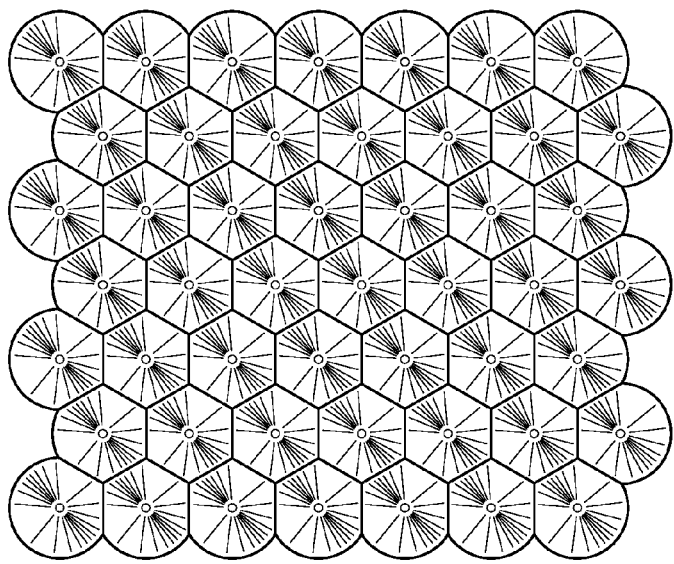
Figure 6C:
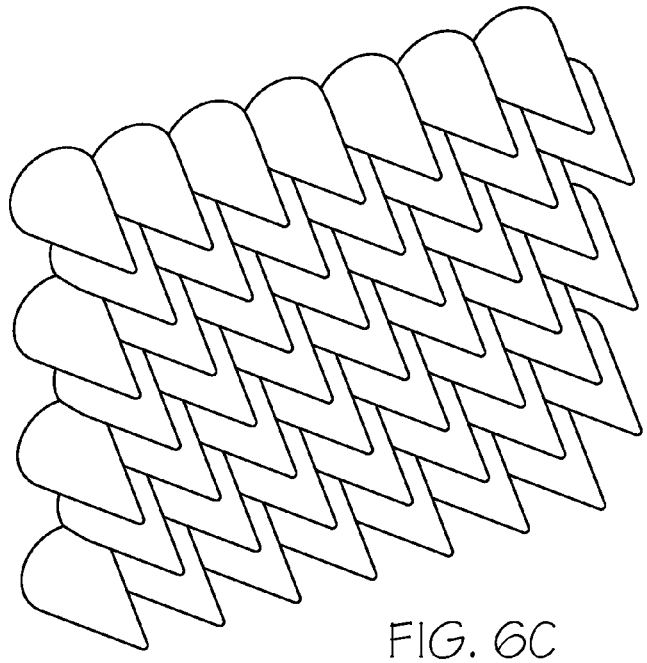

The nanostructures 54 of the array 60 may be packed in various configurations on the first major surface 56 of the substrate 52. The packing configuration may be a design consideration and may be dictated by, among other things, the geometry of the nanostructures 54. As one non-limiting example, the nanostructures 54 of the array 60 may be packed in a square configuration, as shown in FIGS. 5A-5C. As another non-limiting example, the nanostructures 54 of the array 60 may be packed in a hexagonal configuration, as shown in FIGS. 6A-6C.

Figure 7A:
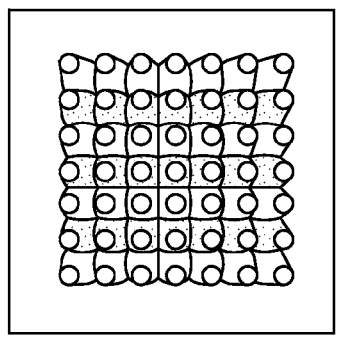
FIG. 7A is a top plan view of a periodic nanostructure array in accordance with one aspect of the present disclosure.
Figure 7B:
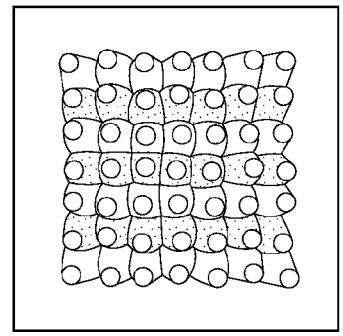
FIG. 7B is a top plan view of a non-periodic nanostructure array with 20 percent position variation in accordance with another aspect of the present disclosure.
Figure 7C:
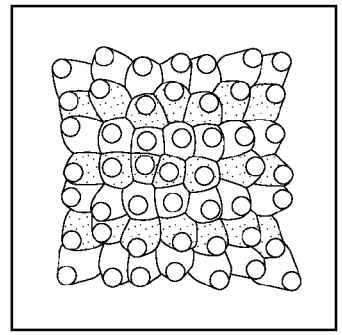
FIG. 7C is a top plan view of a non-periodic nanostructure array with 50 percent position variation in accordance with yet another aspect of the present disclosure.

As shown in FIG. 7A, the array 60 of nanostructures 54 may be a periodic array. However, non-periodic arrays are also contemplated. As one non-limiting example, the array 60 may be a periodic array with a 20 percent position variation, as shown in FIG. 7B. As another non-limiting example, the array 60 may be a periodic array with a 50 percent position variation, as shown in FIG. 7C.

Referring back to FIG. 4, the proximal end 62 of each nanostructure 54 in the array 60 may be contiguous with the proximal ends 62 of adjacent nanostructures 54. Therefore, the proximal ends 62 of the nanostructures 54 in the array 60 may form a contiguous layer 66 over the first major surface 56 of the substrate 52.

At this point, those skilled in the art will appreciate that the contiguous layer 66 formed by the proximal ends 62 of the nanostructures 54 may cover the first major surface 56 of the substrate 52 such that substantially none of the first major surface 56 of the substrate 52 is exposed. In one expression, the contiguous layer 66 may substantially completely cover the first major surface 56. In another expression, the contiguous layer 66 may cover the first major surface 56 such that no more than 5 percent of the first major surface 56 is exposed. In another expression, the contiguous layer 66 may cover the first major surface 56 such that no more than 3 percent of the first major surface 56 is exposed. In another expression, the contiguous layer 66 may cover the first major surface 56 such that no more than 1 percent of the first major surface 56 is exposed. In yet another expression, the contiguous layer 66 may cover the first major surface 56 such that no more than 0.5 percent of the first major surface 56 is exposed.

Figure 8:
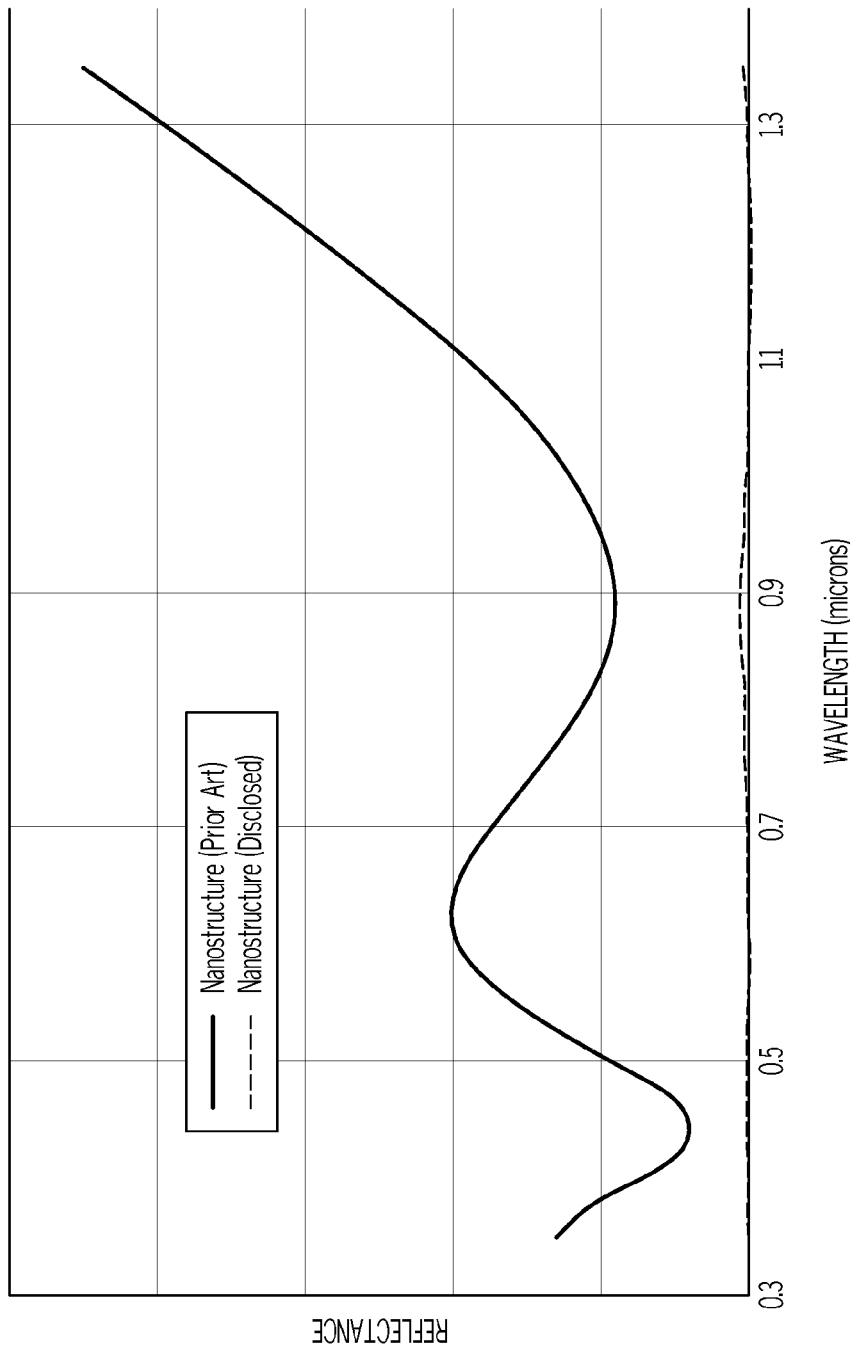
FIG. 8 is a graphical representation of reflectance versus wavelength for anti-reflection nanostructure assemblies both with and without interstitial gaps.

Without being limited to any particular theory, it is believed that eliminating interstitial gaps between nanostructures 54 in the array 60 such that substantially none of the first major surface 56 of the substrate 52 is exposed may result in a smoothly varying apparent index of refraction of the nanostructure array 60 (local discontinuities may be substantially eliminated). Therefore, anti-reflection performance of the disclosed anti-reflection nanostructure assembly 50 may be significantly improved over a broad range of wavelengths. FIG. 8 provides a graphical comparison of reflectance versus wavelength for the disclosed anti-reflection nanostructure assembly (without interstitial gaps) and for a prior art anti-reflection nanostructure assembly (with interstitial gaps). Significant improvement in anti-reflection performance is observed in FIG. 8 over the entire waveband (300 nm to 1300 nm).

While the present disclosure focuses on anti-reflection (optical) applications, those skilled in the art will appreciate that the disclosed nanostructure assemblies may be applicable to any wave-based phenomena, such electromagnetic (e.g., radar) and acoustic (e.g., anechoic chambers).

Various techniques, whether now known or later developed, may be used to manufacture the disclosed anti-reflection nanostructure assembly 50. Selection of a suitable manufacturing technique may require consideration of, among other things, the type of substrate 52 upon which the array 60 of nanostructures 54 will be formed.

In one manifestation, the disclosed anti-reflection nanostructure assembly may be manufactured by etching the nanostructure array directly into the substrate, as is known in the art. For example, the nanostructure array may be formed by chemical etching, ion etching or a combination of chemical etching and ion etching.

In another manifestation, the disclosed anti-reflection nanostructure assembly may be manufactured by imprinting or embossing, as is known in the art. Referring to FIG. 9, one suitable imprinting process, generally designated 100, may include an imprinting subsystem 102 that receives a film 104 (e.g., ETFE) from a supply roll 106 and outputs an anti-reflection nanostructure assembly for take-up on a take-up roll 108. The imprinting subsystem 102 may include an imprinting die 110 and a backing die 112. An optional heater 114 may be included in the imprinting subsystem 102 to heat the film 104 prior to imprinting.

The imprinting die 110 may include an imprinting surface 116 having a negative image of the desired nanostructure array. For example, the negative image may be formed by first constructing a master mold (not shown) having a positive image of the desired nanostructure array. Then, the master mold may be used to form the negative image on the imprinting surface 116 of the imprinting die 110.

The anti-reflection nanostructure assembly may be formed by pressing the film 104 between the imprinting die 110 and the backing die 112 such that the negative image on the imprinting surface 116 of the imprinting die 110 is transferred to the film 104 as a positive image. If necessary, such as when a resist material is used on the surface of the film 104, the imprinted film may be cured, such as by heating or exposing the film to ultraviolet light, to set the imprinted nanostructure array.

Referring to FIG. 10, also disclosed is a method, generally designated 200, for reducing reflectance at an interface, such as an air-to-substrate. Without being limited to any particular theory, the disclosed method 200 may smoothly vary the apparent index of refraction at the air-to-substrate interface, thereby significantly improving anti-reflection performance.

The method 200 may begin at Block 202 with the step of providing a substrate. The substrate may be formed from an optical material, such as ETFE, glass, a semiconductor or the like.

At Block 204, the operating wavelength (or the operating wavelength range) of the substrate may be determined. The operating wavelength (or the operating wavelength range) may depend on the application. For example, for photovoltaic applications, the operating wavelength range may include the ultraviolet to near infrared portion of the spectrum—about 350 nm to about 2,000 nm.

At Block 206, a nanostructure array may be formed on the substrate, such as by imprinting, embossing, etching or the like. The nanostructure array may include nanostructures that are substantially free of facets, wherein the nanostructures include a proximal end and are tapered from the proximal end to a distal end, and wherein the proximal ends form a contiguous layer on the substrate. The height H of the nanostructures, the maximum width W of the nanostructures, the aspect ratio of the nanostructures, the number density of the nanostructures and the packing configuration of the nanostructures, among other design considerations, may be selected based on the desired operating wavelength ascertained in Block 204 or the manufacturing process selected to perform Block 206.

Although various aspects of the disclosed anti-reflection nanostructure array and method have been shown and described, modifications may occur to those skilled in the art upon reading the specification. The present application includes such modifications and is limited only by the scope of the claims.

What is claimed is:

1. An anti-reflection nanostructure assembly comprising:
    a substrate; and
    an array of nanostructures, wherein each nanostructure of said array of nanostructures comprises a proximal end and a distal end, and is tapered from said proximal end to said distal end, wherein each nanostructure of said array of nanostructures has a height and a width, wherein said width is at least 400 nm and a ratio of said height to said width ranges from about 1.5 to about 4, and wherein said proximal end of each nanostructure of said array of nanostructures is overlapped with said proximal ends of adjacent nanostructures of said array of nanostructures to form a contiguous layer on said substrate.

2. The anti-reflection nanostructure assembly of claim 1 wherein said substrate comprises an optical material.

3. The anti-reflection nanostructure assembly of claim 1 wherein said substrate comprises an optical polymer.

4. The anti-reflection nanostructure assembly of claim 1 wherein said array of nanostructures is integral with said substrate.

5. The anti-reflection nanostructure assembly of claim 1 wherein substrate and said array of nanostructures are formed from the same material.

6. The anti-reflection nanostructure assembly of claim 1 wherein said substrate is formed from a first material and said array of nanostructures is formed from a second material, said second material being different than said first material.

7. The anti-reflection nanostructure assembly of claim 1 wherein each nanostructure of said array of nanostructures comprises one of a regular conical structure and an irregular conical structure.

8. The anti-reflection nanostructure assembly of claim 1 wherein said taper is substantially constant from proximate said proximal end to proximate said distal end.

9. The anti-reflection nanostructure assembly of claim 1 wherein distal end terminates at a pointed tip.

10. The anti-reflection nanostructure assembly of claim 1 wherein each nanostructure of said array of nanostructures has an outer surface having a continuous curvature.

11. The anti-reflection nanostructure assembly of claim 1 wherein each nanostructure of said array of nanostructures has an outer surface, and wherein said outer surface is substantially free of facets.

12. The anti-reflection nanostructure assembly of claim 1 wherein said array of nanostructures comprises about 1 to about 500 of said nanostructures per square micrometer of said substrate.

13. The anti-reflection nanostructure assembly of claim 1 wherein said nanostructures of said array of nanostructures are packaged in one of a square configuration and a hexagonal configuration.

14. The anti-reflection nanostructure assembly of claim 1 wherein said array of nanostructures is a periodic array.

15. The anti-reflection nanostructure assembly of claim 1 wherein said array of nanostructures is a non-periodic array.

16. A method for reducing reflectance at an interface comprising the steps of:
    providing a substrate; and
    forming an array of nanostructures, wherein each nanostructure of said array of nanostructures comprises a proximal end and a distal end, and is tapered from said proximal end to said distal end, wherein each nanostructure of said array of nanostructures has a height and a width, wherein said width is at least 400 nm and a ratio of said height to said width ranges from about 1.5 to about 4, and wherein said proximal end of each nanostructure of said array of nanostructures is overlapped with said proximal ends of adjacent nanostructure of said array of nanostructures to form a contiguous layer on said substrate.

17. The method of claim 16 further comprising the step of determining an operating wavelength or wavelength range, wherein said height and said width are selected based on said operating wavelength or wavelength range.

18. The anti-reflection nanostructure assembly of claim 1 wherein said ratio ranges from about 1.5 to about 3.

19. The anti-reflection nanostructure assembly of claim 1 wherein said ratio ranges from about 1.5 to about 2.

* * * * *